United States Patent [19]

Klein et al.

[11] Patent Number: 5,671,774
[45] Date of Patent: Sep. 30, 1997

[54] RATE-OF-FLOW CONTROL VALVE

[75] Inventors: Robert D. Klein, Milton-Freewater, Oreg.; Jeffrey P. Kreitzberg, Walla Walla, Wash.

[73] Assignee: Nelson Irrigation Corporation, Walla Walla, Wash.

[21] Appl. No.: 665,695

[22] Filed: Jun. 18, 1996

[51] Int. Cl.$^6$ ................................................ F16K 31/12
[52] U.S. Cl. .................... 137/486; 137/488; 251/25; 251/28
[58] Field of Search ............................ 137/486, 488; 251/25, 28, 33

[56] References Cited

U.S. PATENT DOCUMENTS

| 1,466,412 | 8/1923 | Samain . | |
|---|---|---|---|
| 2,696,083 | 12/1954 | Eddy | 137/486 |
| 3,171,432 | 3/1965 | Bard | 137/486 |
| 3,177,891 | 4/1965 | Reese . | |
| 3,511,267 | 5/1970 | Stonich | 137/486 |
| 3,580,272 | 5/1971 | Sherman et al. . | |
| 4,697,616 | 10/1987 | Ashcroft | 137/486 |
| 5,109,884 | 5/1992 | du Plessis . | |
| 5,158,230 | 10/1992 | Curran | 137/486 |
| 5,174,339 | 12/1992 | Pickard | 137/486 |
| 5,358,177 | 10/1994 | Cashmore | 137/486 |

FOREIGN PATENT DOCUMENTS

| 530438 | 9/1955 | Italy | 137/486 |
|---|---|---|---|
| 404060 | 3/1974 | U.S.S.R. | 137/486 |

OTHER PUBLICATIONS

"Nelson 800 Series Control Valve Application Guide", Nelson Irrigation Corporaiton, Jan. 1996.
"800 Series Control Valves", Nelson Irrigation Corporation brochure, Aug. 1994.

Primary Examiner—Denise L. Ferensic
Assistant Examiner—Ramyar M. Farid
Attorney, Agent, or Firm—Nixon & Vanderhye P.C.

[57] ABSTRACT

A rate-of-flow control valve assembly actuable as a function of velocity of fluid in a conduit includes a sensing plate projecting into the conduit, substantially perpendicular to a direction of flow in the conduit and a sleeve valve located downstream of the sensing plate. The sleeve valve includes a substantially cylindrical, flexible rubber sleeve surrounded by a control chamber, and an outer rigid sleeve, the flexible sleeve adapted to vary the flow rate of the fluid through the sleeve valve. Also included is a spool valve controller operatively connected to the sensing plate and in communication with the control chamber in the sleeve valve, the spool valve operable to control the flow of fluid into and out of the control chamber as a function of movement of the sensing plate in the conduit.

8 Claims, 4 Drawing Sheets

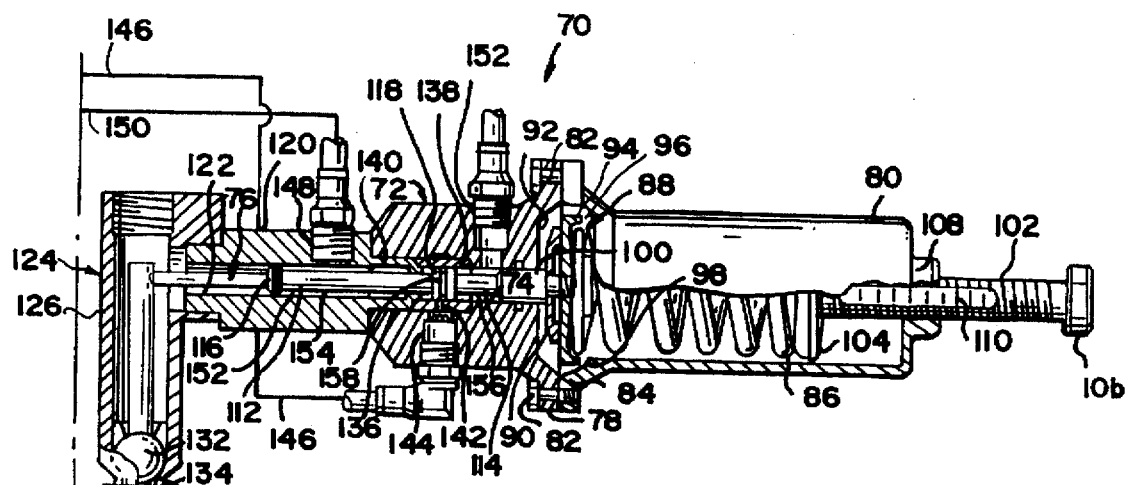
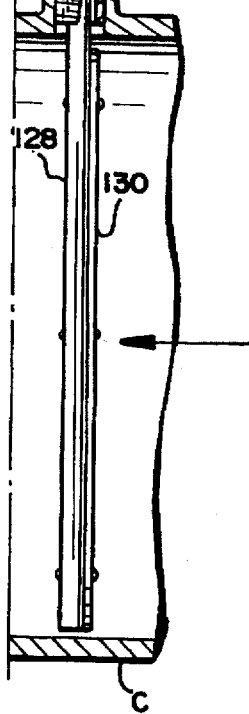
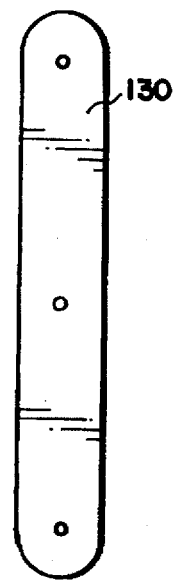
FIG. 1B
FIG. 2

RATE-OF-FLOW CONTROL VALVE

TECHNICAL FIELD

The present invention relates to a rate-of-flow control valve and specifically, to a control valve that operates solely as a function of the velocity of the fluid in a pipe.

BACKGROUND AND SUMMARY OF THE INVENTION

Historically, most control valves operate off fluid pressure in the system. This also applies to "rate-of-flow" valves that mostly use an orifice plate in the flow, and work off the pressure differential loss across the orifice plate to set a certain flow rate. This is not a very reliable method to control flow rate in realistic field applications, however, due to wear on the orifice plates, cavitation problems, and high pressure loss across the orifice plate (typically about 10 p.s.i. minimum).

The rate-of-flow valve in accordance with this invention operates solely by velocity of the fluid in a pipe or conduit, and is designed to be indifferent to the pressure in the pipe. In the exemplary embodiment, a sensing plate in a fluid stream is acted upon by the velocity of the fluid (typically water) in the pipe. This applies a force to the sensing plate shaft, causing a moment to be induced on the sensing plate end of the shaft. The shaft rotates about a ball joint between the shaft ends and causes a second moment at the opposite or control end of the shaft. The control end of the shaft is connected to a spool shaft of a three-way spool controller. The spool shaft is acted upon by the second moment, causing the spool shaft to shift axially so as to control fluid to or from a control chamber of a conventional sleeve valve, modified to incorporate the necessary connections to the spool controller. Depending on the direction of movement of the spool shaft, fluid passing through the sleeve valve is increased or decreased until a desired flow rate is achieved.

A normal axial spring bias on the spool shaft is adjustable by reason of a calibrated stem which allows the user to adjust the flow rate to different gallon per minute values as marked on the stem. The calibration is based on the area of the sensing plate, the area of the inside diameter of the pipe or conduit, and the location of the sensing plate on the plate shaft. The area and location of the sensing plate are set values at the factory, while the inside diameter will be specified in the installation procedure.

The rate-of-flow control valve in accordance with this invention addresses many problems in field applications. For example, many systems experience "water hammer" on start-up, due to empty systems downstream of the valve. A standard control valve working off downstream system pressure will come full open trying to pressurize empty downstream lines. This results in flow rates through the valve that are 2 to 10 times higher than the system uses once fully pressurized. The control valve cannot act quickly enough when just sensing downstream pressure to slow this large flow rate down smoothly. "Water hammer" is the result, while the valve in accordance with this invention helps to hold the flow rate at the level that the system uses when fully pressurized.

In addition, the rate-of-flow control valve in accordance with this invention is modulated so that any change in the fluid medium (such as air or water) in the control chamber can be compensated for since this device senses velocity in the pipe directly.

The rate-of-flow control valve also remains operational in the event of a change fluid medium within the pipe. For example, if air bubbles pass through the pipe with water as the main medium, then the rate-of-flow device continues to operate, albeit with slightly less accuracy.

Finally, pressure loss across the sensing plate is very low compared to similar orifice plate application rate-of-flow control valves.

In accordance with the exemplary embodiment, therefore, there is provided a rate-of-flow control valve assembly actuable as a function of fluid velocity in a conduit comprising a) a sensing plate projecting into the conduit, substantially perpendicular to a direction of flow in the conduit; b) a sleeve valve located downstream of the sensing plate, the sleeve valve including a substantially cylindrical, flexible sleeve surrounded by a control chamber, the flexible sleeve adapted to vary the flow rate of the fluid through the sleeve valve; and c) a spool valve controller operatively connected to the sensing plate and in communication with the control chamber in the sleeve valve, the spool valve controller operable to control the flow of fluid into and out of the control chamber as a function of movement of the sensing plate in the conduit.

Other objects and advantages of the subject invention will become apparent from the detailed description which follows.

BRIEF DESCRIPTION OF THE DRAWINGS

FIGS. 1A and 1B together represent a cross sectional view of the rate-of-flow control valve assembly in accordance with an exemplary embodiment of the invention, with FIG. 1B drawn to a larger scale for the sake of clarity;

FIG. 2 is a side elevation of a sensing plate employed in FIG. 1;

DETAILED DESCRIPTION OF THE DRAWINGS

Figure 1A:
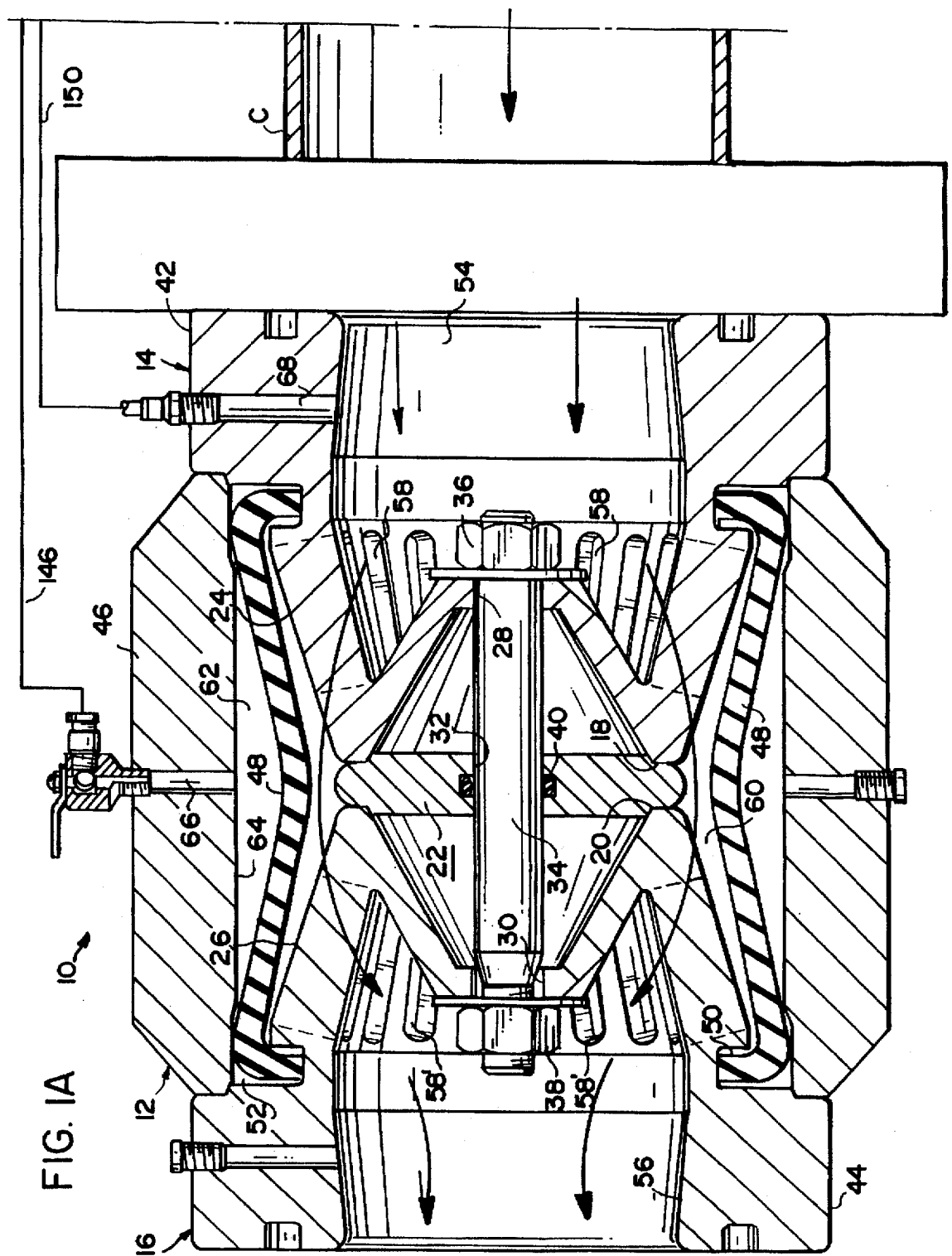

With reference now to FIGS. 1A and 1B, a rate-of-flow control valve assembly 10 in accordance with an exemplary embodiment of the invention is shown to include a sleeve valve 12 which includes a pair of generally similar cage portions. More specifically, an upstream cage portion 14 is axially aligned with a downstream cage portion 16 in back to back relationship, such that an annular axial edge 18 of the upstream cage portion and an annular edge 20 of the downstream cage portion 16 are sandwiched about a round solid center barrier 22. The annular edges 18, 20, lie at the base of respective conical portions 24, 26 which, in turn, are formed with center bores 28, 30 which are also axially aligned with a similar sized opening 32 in the center barrier 22. This arrangement allows the upstream and downstream cages 14, 16 to be clamped together by means of a bolt 34, threaded at both ends, secured by associated nuts 36, 38. An O-ring seal 40 is interposed between the bolt 34 and the center barrier 22.

Each cage 14, 16 has a radial flange end 42, 44, respectively, between which is clamped a rigid cylindrical sleeve 46. A substantially cylindrical, flexible sleeve or diaphragm 48 (preferably rubber) is anchored in annular grooves 50, 52 formed in the respective cage portions, and clamped in place by the rigid, outer sleeve 46.

Referring to the flow arrows shown in FIG. 1A, it will be appreciated that a fluid flow path is defined for fluid flowing in a conduit C, the path extending between an inlet 54 and an outlet 56, which path includes openings 58, 58' formed in the upstream and downstream cages 14, 16, respectively, and which direct the fluid into an area 60 surrounding the inner portion of the cages, i.e., an annular area radially between the conical portions 24, 26 of the cages and the flexible sleeve 48. A radially outer, annular control chamber 62 surrounds the flexible diaphragm or sleeve 48 and is bounded by the inner wall 64 of the outer rigid sleeve 46. Even without having described the control mechanism for the valve, it is apparent that by expanding or constricting the annular flexible sleeve 48, more or less fluid will be permitted to flow through the sleeve valve 12. This sleeve valve as described to this point is of conventional construction and may be one similar to the commercial "800 Series Sleeve Valve" available from the assignee of this invention. A radial passage or port 66 is drilled through the sleeve 46 and opens into the chamber 62, while a second port 68 is drilled through the end flange 42 of the upstream cage 14 and opens into the valve inlet 54. These ports are for use with the spool controller as described below.

The spool valve controller device 70, as shown in FIG. 1B, includes a spool main body portion 72 formed with an axial throughbore 74 which slidably mounts a spool shaft 76. At one end of the spool body (to the right in FIG. 1), a radial flange 78 permits the attachment of a calibrating spring canister 80 by means of screws 82 extending between the radial flange 84 on the canister and the radial flange 78 of the controller body 72. A coil spring 86 mounted in the canister 80 may be adjusted to create desired axial bias on the spool shaft 76 via a plate assembly 88 fixed at a first end of the spring. One plate element 90 is arranged to strike a surface 92 of the spool body 72 when the plate assembly moves to the left as viewed in FIG. 1B. An adjacent plate element 94 has an annular peripheral edge 96 adapted to strike an annular shoulder 98 formed in the canister 80 when the plate assembly 88 moves to the right. Thus, plate elements 90 and 94 serve as limit stops for axial movement of the spool shaft 76 as described in further detail below.

As also shown in FIG. 1B, plate element 90 engages an enlarged cylindrical end 100 of the spool shaft 76. The spool shaft 76 is thus normally urged to the left under the influence of spring 86, and the spring force is adjustable by the utilization of a calibrated stem 102 which includes a disc 104 at one end, adapted to engage a second, opposite end of the spring 86. The other end of the stem extends beyond the canister 80 and includes a bolt head 106 or other suitable means for adjusting the stem, manually or via a tool. The stem 102 is threadably mounted in the canister end wall 108 and includes flow rate indicia 110 enabling the user to set the desired flow rate for fluid flowing through the rate-of-flow control valve 10.

The spool shaft 76 is formed with reduced diameter portions 112 and 114 extending between single land 116, double land 118, and the larger diameter end 100. It will be appreciated that lands 116, 118 and enlarged end 100 seal to the surrounding bore surface and prevent leakage of fluid along the shaft 76.

A spool housing extension 120 is threadably secured to the main spool body 72 at an end of the housing opposite the spring canister 80. The housing extension is also formed with a throughbore 122, axially aligned with the bore 74 in the main spool body 72. The extension 120 mounts a sensing plate assembly 124 including a housing 126. The housing 126 supports a sensing plate shaft 128 which extends substantially perpendicularly downwardly relative to the spool shaft 76. The sensing plate shaft 128, in turn, supports a solid sensing plate 130 (see also FIG. 3) which is located within the conduit stream as shown in FIG. 1B, oriented perpendicular to the direction of flow of fluid (typically water) in the conduit. The sensing plate has a width substantially less than the inner diameter of the conduit and is preferably located centrally thereof.

The sensing plate shaft 128 includes a ball element 132 seated in a semi-spherical seat 134 within housing portion 124, and the shaft extends upwardly to a location where it is connected to an end of the spool shaft 76. It will be appreciated that pivoting movement of the sensing plate 130 in either direction about the ball 132 will result in corresponding axial movement of the spool shaft 76.

The spool shaft 76 extends through the axially aligned bores 74 and 122 formed in the housing extension 120 and main spool body 72. The latter is counterbored at 136 and receives a sleeve 138 held in place by a threaded end 140 of the extension 120. Sleeve 138 includes a radial orifice 140 which connects to a valve port 144 in the body 72 and which, in turn, connects to the port 66 in the sleeve valve by means of a flexible tube 146. An upstream port 148 formed in the extension 120 connects to the port 68 in the end flange 42 of upstream cage 14 by means of a flexible tube 150. A vent port 152 is also formed in the spool body 72 for selective communication with the valve port 144 as described further below.

The lands 116 and 118 on the spool shaft 76 combine to form a first spool chamber 154, while the land 118 and enlarged end 100 combine to form a second spool chamber 156. The small axial space between the adjacent lands of the double land 118 forms a third spool chamber 158. The function of the various spool chambers will be made apparent from the description below of the operation of the spool controller 70.

The stem 102 is calibrated based on the spring (86) constant, the area of sensing plate 130, the area of the inside diameter of the pipe C, and on the axial location of plate 130 on shaft 128.

In the event of correct velocity of fluid flowing through the conduit C, the gallons per minute is equal to the desired set value on the calibrated stem 102. In this instance, the force of spring 86 is in equilibrium with the velocity force on the sensing plate, resulting in no axial movement of the spool shaft 76. Specifically, the spool shaft 76 is in a neutral or null position shown in FIG. 1B. In this position, no flow is permitted into or out of the control chamber 62 since the double land 118 on spool shaft 76 is located such that chamber 158 is aligned with orifice 142, but the adjacent lands prevent any flow into spool chambers 154 and/or 156. This lack of movement of water either in or out of the control chamber 62 allows the sleeve valve 10 to continue to hold the desired gallons per minute set on the calibrated stem 102.

Figure 4:
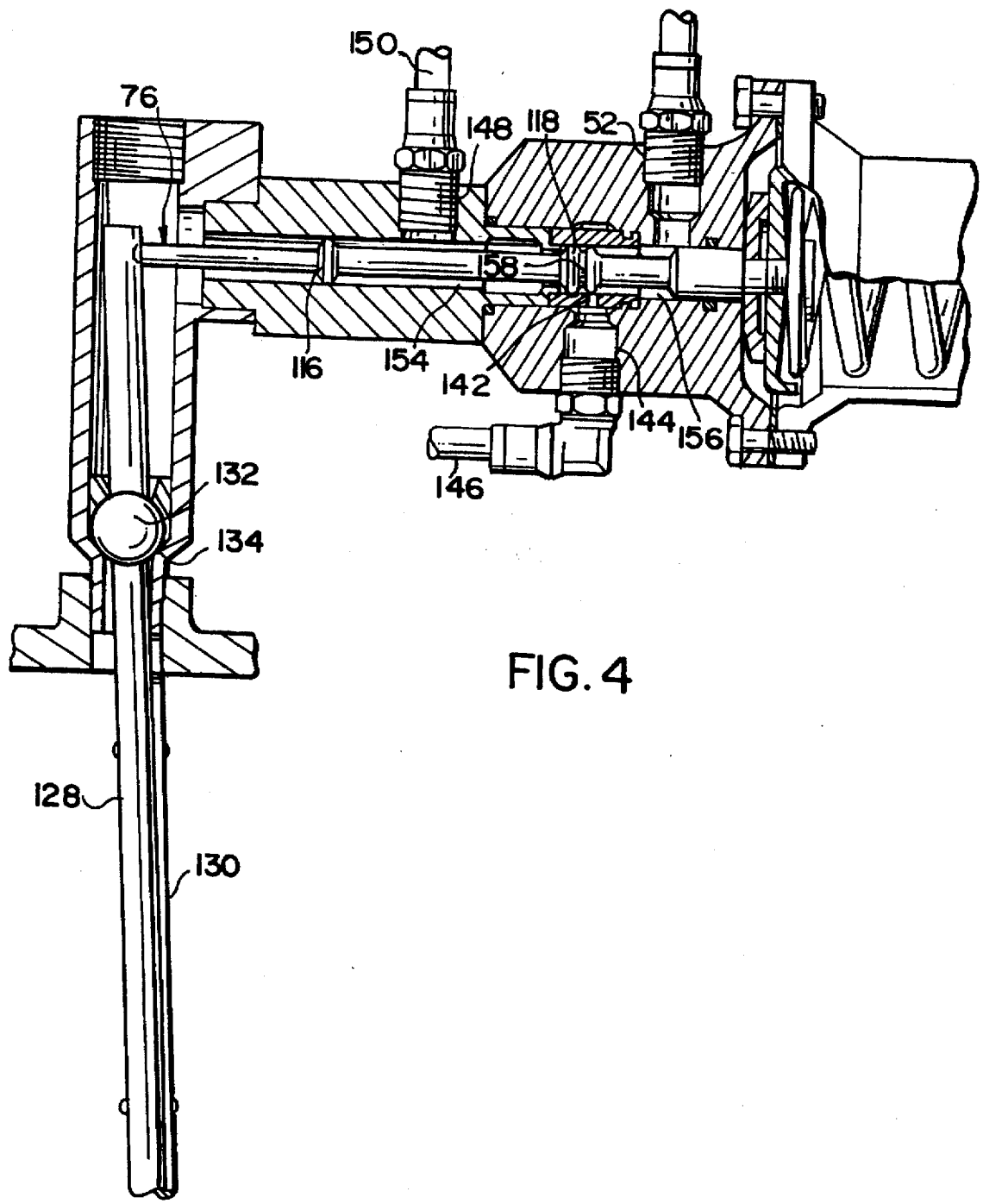
FIG. 4 is a partial cross section similar to FIGS. 1B and 3 but illustrating a condition of low velocity where the gallons per minute is below the desired set value on a calibrated stem.

In the event of low velocity of fluid through the conduit C, and where the gallons per minute is below the desired set value on the calibrated stem 102, the force of spring 86 becomes dominant over the velocity force on the sensing plate 130. This causes the spool shaft to shift to the left as seen in FIG. 4. In this position, fluid from control chamber 62 is allowed to flow through valve port 144, into spool chamber 156 and out of the spool controller via the vent port 152. This movement of water out of the control chamber 62 allows the sleeve 48 to expand which, in turn, allows more fluid to flow through the sleeve valve 12 until the desired gallons per minute set on the calibrated stem 102 is reached.

Water flowing out of the vent port 152 can be sent to a reservoir, recirculated to the conduit C or otherwise disposed of in any suitable manner.

Figure 3:
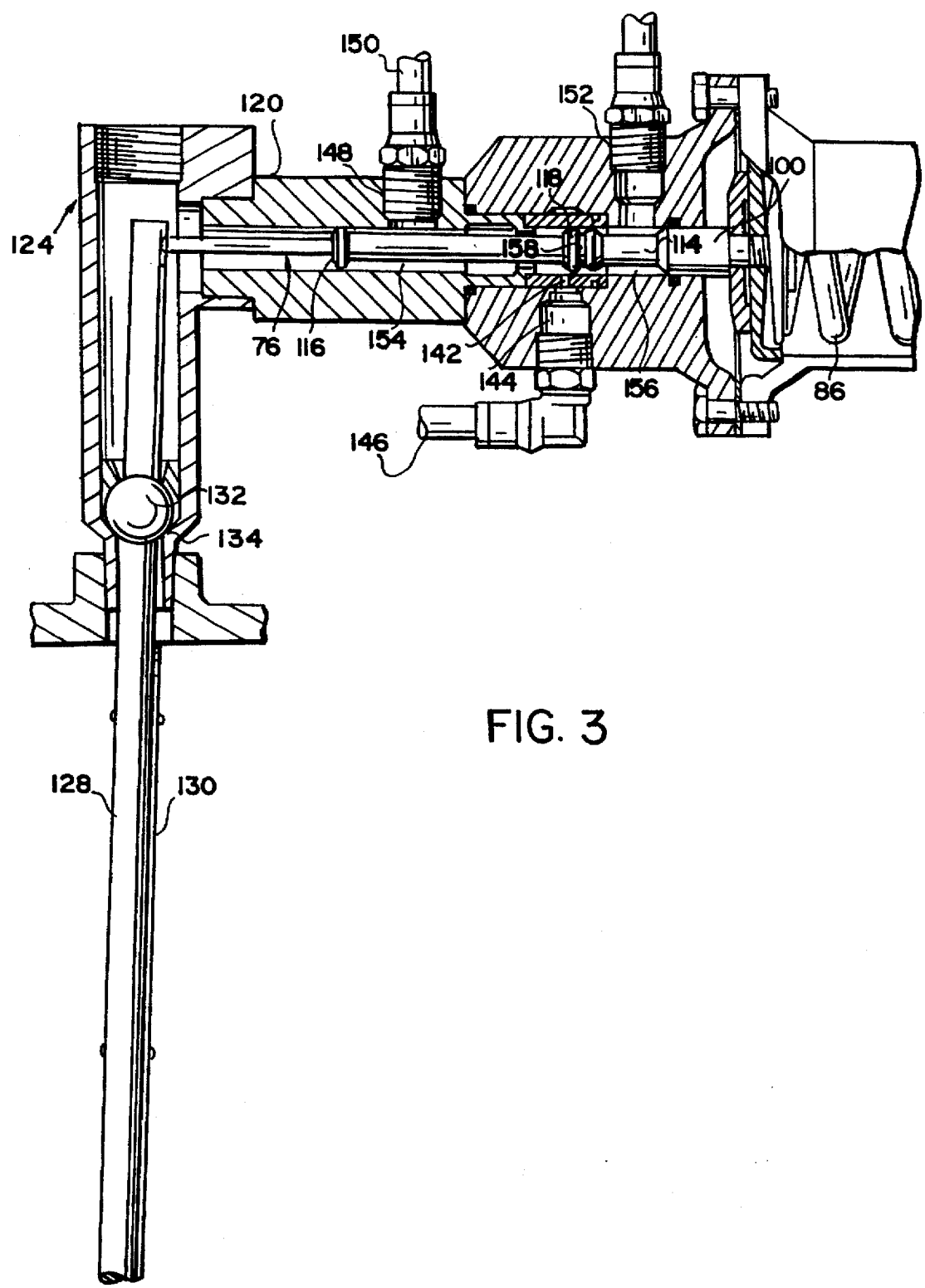
FIG. 3 is a partial cross section similar to FIG. 1B, but illustrating a condition of high velocity where the gallons per minute through the conduit is above a desired set value.

In the event of high velocity where the gallons per minute is above the desired set value on the calibrated stem 102, the velocity force on the sensing plate 130 becomes dominant over the spring force. This causes the spool shaft to shift to the right as shown in FIG. 3. In this position, the vent port 152 is effectively closed and the valve port 144 communicates with the upstream port 148 via spool chamber 154. Now water from sleeve valve inlet port 68 is allowed to flow into port 148, through chamber 154 and valve port 144, through tube 146 to port 66 and into the control chamber 62. As a result, flexible sleeve 48 is constricted so that less water is allowed to flow through the sleeve valve until the desired gallons per minute set on the calibrated stem 102 is reached.

The above described sleeve valve assembly and associated spool valve thus provide a relatively simple, accurate, and easy to use rate-of-flow control valve which enables the user to quickly achieve a desired flow rate within a conduit. And while the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A rate-of-flow control valve assembly actuable as a function of velocity of fluid in a conduit comprising:

a) a sensing plate projecting into the conduit, substantially perpendicular to a direction of flow in said conduit;

b) a sleeve valve located downstream of said sensing plate, said sleeve valve including a substantially cylindrical, flexible rubber sleeve surrounded by a control chamber and an outer rigid sleeve, said flexible sleeve configured to vary the flow rate of the fluid through said sleeve valve; a first sleeve valve port through said outer rigid sleeve and opening into said control chamber; and a second sleeve valve port opening to an inlet end of said sleeve valve; and c) a spool valve controller operatively connected to said sensing plate and in communication with said control chamber, said spool valve controller having a spool shaft engageable by said sensing plate and operable to control the flow of fluid into and out of said control chamber as a function of movement of said sensing plate in said conduit wherein said spool valve controller is formed with a bore in which said spool shaft is slidably received, said spool shaft having means cooperating with said bore to define at least first and second spool valve chambers; said spool valve controller having a first spool valve port in fluid communication with said first sleeve valve port and either of said first and second spool valve chambers depending on axial location of said spool shaft; said spool valve controller having a second spool valve port in communication with said second sleeve valve port and said first spool valve chamber and communicable with said first sleeve valve port via said spool valve port depending on axial location of said spool shaft; said spool valve controller also having a third spool valve port in fluid communication with said second spool valve chamber and communicable with said first sleeve valve port via said first spool valve port depending on axial location of said spool shaft.

2. The assembly of claim 1 wherein said sensing plate is attached to a rod pivotally mounted intermediate opposite ends thereof within a housing, one of said opposite ends, remote from said sensing plate, being connected to said spool shaft such that pivoting movement of said sensing plate is converted to axial movement of said spool shaft.

3. The assembly of claim 2 wherein, when said sensing plate moves in response to a less than desired flow rate, said spool shaft moves axially to a position where said third spool valve port communicates with said first spool valve port via said second spool valve chamber so that fluid in said sleeve valve control chamber flows out of said control chamber, through said first spool valve port, second spool valve chamber and third spool valve port, to thereby cause expansion of said flexible sleeve.

4. The assembly of claim 2 wherein, when said sensing plate moves in response to a greater than desired flow rate, said spool shaft moves axially to a position where said second spool valve port communicates with said first spool valve port via said first spool valve chamber so that fluid flows from said second sleeve valve port through said second spool valve port, said first spool valve chamber and said first spool valve port to said first sleeve valve port and into said sleeve valve control chamber to thereby cause constriction of said flexible sleeve.

5. The assembly of claim 2 wherein, when said sensing plate is in a neutral position with flow rate equal to a desired flow rate, the spool shaft is positioned to block any flow to or from the control chamber.

6. The assembly of claim 1 wherein said sleeve valve comprises upstream and downstream cage members clamped together about a center barrier disc and wherein said flexible sleeve surrounds outer portions of said cage members and further wherein said control chamber is defined by said flexible sleeve and said outer rigid sleeve which is clamped between radial flanges of said cage members.

7. The assembly of claim 1 wherein said spool valve controller includes an adjustment stem and a spring device for applying a biasing force on said spool shaft.

8. The assembly of claim 7 wherein said adjustment stem and spring are calibrated to permit adjustment of the rate of flow of fluid through said sleeve valve.

* * * * *